United States Patent
Favre et al.

(10) Patent No.: US 9,575,467 B2
(45) Date of Patent: Feb. 21, 2017

(54) METHOD FOR CHECKING THE IDENTITY OF A MECHANICAL WATCH MOVEMENT

(71) Applicant: Montres Breguet SA, L'Abbaye (CH)

(72) Inventors: Jerome Favre, Neuchatel (CH); Davide Sarchi, Renens (CH); Polychronis Nakis Karapatis, Premier (CH)

(73) Assignee: Montres Breguet SA, L'Abbaye (CH)

( * ) Notice: Subject to any disclaimer, the term of this patent is extended or adjusted under 35 U.S.C. 154(b) by 209 days.

(21) Appl. No.: 14/327,973

(22) Filed: Jul. 10, 2014

(65) Prior Publication Data
US 2015/0013460 A1   Jan. 15, 2015

(30) Foreign Application Priority Data
Jul. 11, 2013 (EP) .................................... 13176153

(51) Int. Cl.
  *G01D 7/00* (2006.01)
  *G04D 7/00* (2006.01)
  *G01M 7/00* (2006.01)
  *G04B 23/00* (2006.01)

(52) U.S. Cl.
  CPC ............... *G04D 7/001* (2013.01); *G04D 7/00* (2013.01); *G01M 7/00* (2013.01); *G04B 23/00* (2013.01)

(58) Field of Classification Search
  CPC ............ G01M 7/00; G04D 7/00; G04D 7/001; G04D 7/002; G04D 7/1228; G04B 23/00
  USPC .......................................................... 73/579
  See application file for complete search history.

(56) References Cited

U.S. PATENT DOCUMENTS

| 2,782,627 | A | | 2/1957 | Hetzel | |
|---|---|---|---|---|---|
| 3,225,312 | A | * | 12/1965 | Tellerman | ................. B06B 1/08 331/116 M |
| 5,245,875 | A | * | 9/1993 | Tyrode | ..................... G04D 7/00 29/10 |
| 2009/0278670 | A1 | * | 11/2009 | Karapatis | ............. G04B 23/028 340/393.4 |

(Continued)

FOREIGN PATENT DOCUMENTS

| EP | 2 107 437 A2 | 10/2009 |
|---|---|---|
| EP | 2 320 282 A1 | 5/2011 |

(Continued)

OTHER PUBLICATIONS

European Search Report issued Jan. 23, 2015 in Patent Application No. 14 17 5707 (with English Translation of Category of Cited Documents).

(Continued)

*Primary Examiner* — Natalie Huls
(74) *Attorney, Agent, or Firm* — Oblon, McClelland, Maier & Neustadt, L.L.P.

(57) ABSTRACT

The mechanical movement includes a checking device which is a passive indicator element. The passive element is fixed to a fixed support portion of the mechanical movement. The passive element may be a strip or a plate fixed to the fixed support portion of a regulating member and configured to vibrate according to one or more clearly defined vibration frequency components following the vibration of the mechanical movement. The vibration frequency components of the strip or plate define an acoustic signature specific to the timepiece to allow the authenticity of the timepiece to be determined by a measurement of the acoustic signature using an acoustic measuring system.

27 Claims, 3 Drawing Sheets

(56) References Cited

U.S. PATENT DOCUMENTS

| | | | |
|---|---|---|---|
| 2011/0110200 A1 | 5/2011 | Goeller | |
| 2013/0170327 A1 | 7/2013 | Peters et al. | |
| 2014/0013846 A1* | 1/2014 | Decoux | G04D 7/001 73/579 |
| 2014/0013847 A1* | 1/2014 | Decoux | G04D 7/1228 73/579 |
| 2014/0019089 A1* | 1/2014 | Decoux | G04D 7/1228 702/178 |
| 2014/0112106 A1* | 4/2014 | Hielscher | B06B 3/00 367/189 |
| 2015/0053007 A1* | 2/2015 | Decoux | G04D 7/1207 73/579 |

FOREIGN PATENT DOCUMENTS

| | | |
|---|---|---|
| EP | 2 579 186 A1 | 4/2013 |
| WO | WO 2014/009558 A1 | 1/2014 |
| WO | WO 2014/009560 A1 | 1/2014 |

OTHER PUBLICATIONS

European Search Report issued Sep. 9, 2013 in European Application 13176153, filed on Jul. 11, 2013 ( with English Translation).

\* cited by examiner

METHOD FOR CHECKING THE IDENTITY OF A MECHANICAL WATCH MOVEMENT

This application claims priority from European Patent Application No. 13176153.8 filed Jul. 11, 2013, the entire disclosure of which is incorporated herein by reference.

FIELD OF INVENTION

The invention concerns a method for allocating and for checking a unique code of acoustic identification of a timepiece, which includes a mechanical movement. To achieve this, the mechanical movement includes at least one passive indicator element, which is configured to vibrate according to one or more clearly defined vibration frequency components following the vibration of the mechanical movement. As a result of the method for allocating and for checking a unique code of acoustic identification of a timepiece or watch, it is possible to identify any counterfeiting of said watch.

The invention also concerns a mechanical movement provided with a passive indicator element for implementing the method for allocating and for checking a unique code of acoustic identification of a timepiece.

BACKGROUND OF THE INVENTION

In the case of a timepiece, such as a mechanical watch, an acoustic signature or acoustic hallmark consists in studying the noises generated by the escapement. To perform this type of measurement, it is sufficient to position the cased watch on a fitting stand, which is always identical, and to record the sound emitted over time by an aerial or contact microphone. The time signal is then analysed to detect the occurrence of shocks and frictions. These measurements are performed to check the chronometric performances of the mechanical movement and to identify operating defects. There are commercial devices which automatically perform this type of measurement. They are for example produced by Witschi Electronic AG.

To the Applicant's knowledge, these measurements have never been adapted and utilised for detecting any counterfeiting of a timepiece. The reason for this is that the analysis generally does not take account of the specific frequency content of the generated noise. Further, depending on the various systems for measuring the noises generated by a mechanical watch movement, it is difficult to extract behaviour patterns, which are repeated, for different mechanical movements of perfectly identical design. It is to be noted that the simple fact of removing and recasing the same mechanical movement in the watch case is liable to modify certain features, such as the peak shock level. The position of a contact or aerial microphone may also be a source of strong variations in basic acoustic signature indicators. This means that it is not possible to differentiate each watch tested so that it can be precisely identified either as a specific calibre, or as a specific piece.

SUMMARY OF THE INVENTION

It is thus an object of the invention to overcome the drawbacks of the state-of-the art by providing a device for checking the identity of a timepiece with a mechanical movement, which can easily detect the authenticity of said timepiece by means of a time and frequency measurement system measuring the noises generated by the mechanical movement. This passive indicator device does not affect the operation of the movement.

To this end, the invention therefore concerns a method for allocating and for checking a unique code of acoustic identification of a timepiece, which includes a mechanical movement provided with at least one passive indicator element, which is configured to vibrate according to one or more clearly defined vibration frequency components following the vibration of the mechanical movement, wherein the method includes the steps of:
- starting to operate the mechanical movement to induce shocks in the escapement wheel sets,
- generating a vibration of the passive indicator element via the vibration of the mechanical movement to define an acoustic signature specific to the timepiece, and
- checking the identification code of the timepiece by an acoustic measurement of vibration frequencies of the passive indicator element.

Particular steps of the method are defined in dependant claims 2 and 3.

To this end, the invention also concerns a mechanical movement provided with a passive indicator element for implementing the method for allocating and for checking a unique code of acoustic identification of a timepiece according to claim 1, wherein the passive indicator element is fixed to a fixed support portion of the mechanical movement.

Embodiments of the mechanical movement are defined in the dependent claims 5 to 27.

An advantage of the mechanical movement lies in the fact that, owing to a passive indicator element fixed to one part of the mechanical timepiece movement, it is easy to characterize the vibration parameters, which are notably frequency and damping following the vibration of said passive indicator element. It is thus possible to associate these specific vibration parameters with a particular timepiece when a final check of said timepiece is performed prior to delivery. Thus, the passive indicator element with the identifiable vibration of the timepiece can authenticate, i.e. precisely identify said timepiece, so as to prevent any counterfeiting. A counterfeiter would have to have physical access to each watch, or to the database inside the factory to be able to carry out counterfeiting, in order to obtain the correlation between the serial number of the timepiece and its acoustic signature. However, even with this knowledge, it is very difficult, or impossible to make a vibrating element with 3 to 4 modes, whose frequencies are known to 4 significant figures.

Advantageously, with a vibrating element specific to the timepiece, it is possible to measure several vibration modes, which are clearly separated in frequency. It is therefore simple to have a unique and individual acoustic signature for a very large number of timepieces. Any client can check the identity or authenticity of his timepiece, such as his watch, by sending, for example, an acoustic recording of his timepiece to the company which manufactured it. This acoustic recording makes it possible to analyse the acoustic signature, which can validate the correlation with the timepiece identification number. Mobile telephone applications could also be devised and utilised to allow the client to perform an automatic check by connecting to the manufacturer's website.

Advantageously, the passive vibrating indicator element is a strip or blade added to the mechanical movement, which makes it possible to define an acoustic signature based on the vibration frequency of said strip. This strip may be fixed, for example, to the balance cock or bar of a regulating member, which may be an escapement. The strip or strips are arranged in positions on the mechanical movement such that they do not affect the performance of the timepiece.

Advantageously, there may be two strips, each respectively fixed on a fixed structure of two tourbillons, which may be contained in the timepiece. Each strip fixed to a corresponding tourbillon can define a specific acoustic signature as a function of the vibration frequency analysis performed by a microphone measurement system.

BRIEF DESCRIPTION OF THE DRAWINGS

The objects, advantages and features of the method of allocating and checking a unique code of acoustic identification of a timepiece and of a mechanical movement for implementation of the method will appear more clearly in the following description with reference to the drawings, in which.

DETAILED DESCRIPTION OF THE INVENTION

The following description will only briefly describe all the parts of the mechanical timepiece movement, on which is arranged the checking device in the form of a passive indicator element. The following description mainly refers to the type of checking device, to its shape and position inside the mechanical movement for implementing the method of allocating and checking a unique code of acoustic identification of a timepiece.

It is to be noted that the "authenticity of the watch" means the individual identity of each watch. Each timepiece or watch may be identifiable by its identification number or unique code, in order to prevent counterfeiting.

Figure 1:
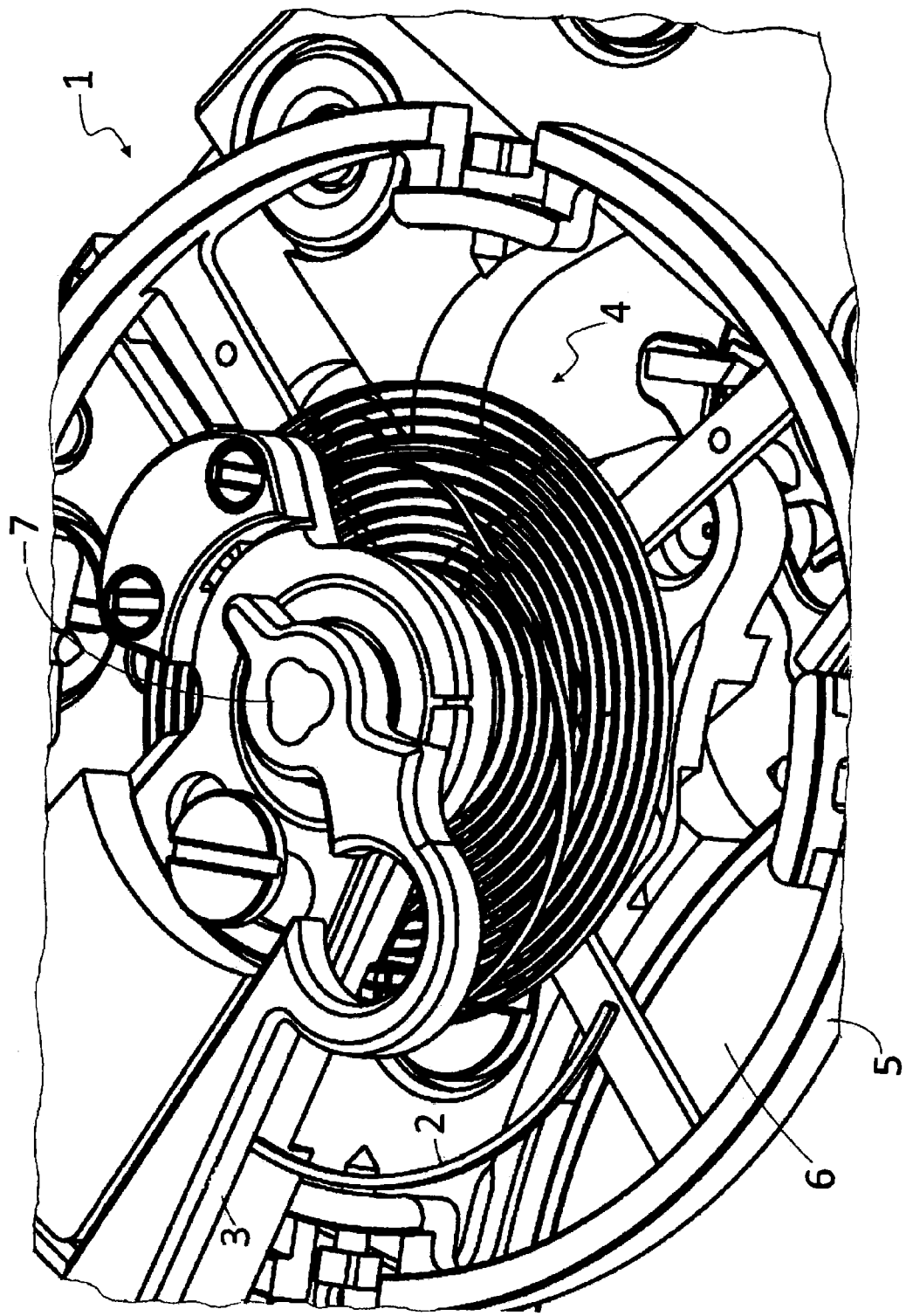
FIG. 1 shows a three-dimensional view of an embodiment of the mechanical movement with the passive indicator element for checking the timepiece according to the invention.

FIG. 1 shows a partial three-dimensional view of a mechanical movement 1 of a timepiece, such as a watch. There is mainly shown a regulating member 4 of the mechanical movement with a sprung balance 5 rotatably mounted on a main plate 6. This regulating member 4 may be a part of an escapement. The sprung balance 5 alternately rotates about an axial pin 7 held rotating freely between plate 6 and a balance cock or bar 3.

The checking device for authenticating or for checking the identity of a timepiece may include a passive indicator element 2 fixed to a fixed support portion of the mechanical timepiece movement. This passive indicator element is configured to vibrate according one or more well defined vibration frequency components following shocks to the mechanical movement. The vibration amplitude of the indicator element is preferably at least 10 times greater than the vibration amplitude of the fixed support portion. Since these frequency components are within an audible frequency range between 800 Hz and 20,000 Hz and since the fundamental frequency (the lowest and most activated) is outside the noise frequency range of the escapement wheel shocks, it is possible to pick up the acoustic noises generated by the passive vibrating element using a contact or aerial microphone of an aforementioned measuring system. The fundamental frequency may preferably be situated between 800 Hz and 4,000 Hz. These vibration frequency components of passive vibrating element 2 are capable of precisely identifying the timepiece, such as the mechanical watch.

Figure 2A:
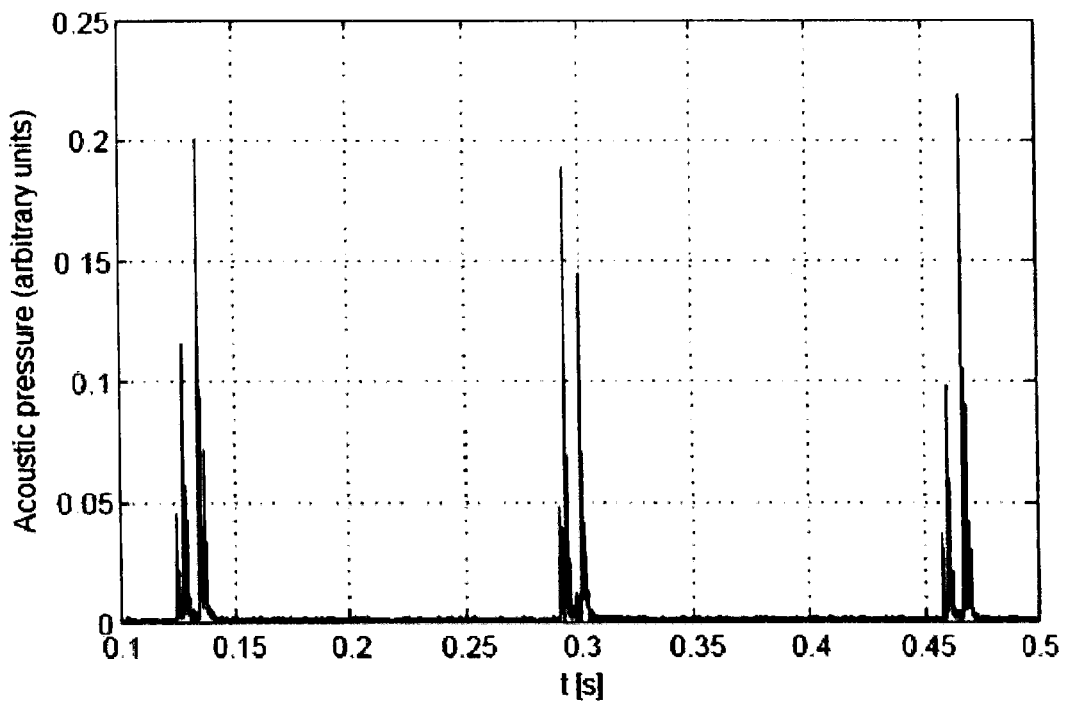
FIGS. 2a and 2b show time graphs of the acoustic signals (absolute acoustic pressure), which are generated by the mechanical movement, on the one hand for a standard escapement, and on the other hand for an escapement which is fitted with the checking device, such as a dedicated vibrating strip according to the invention.
Figure 2B:
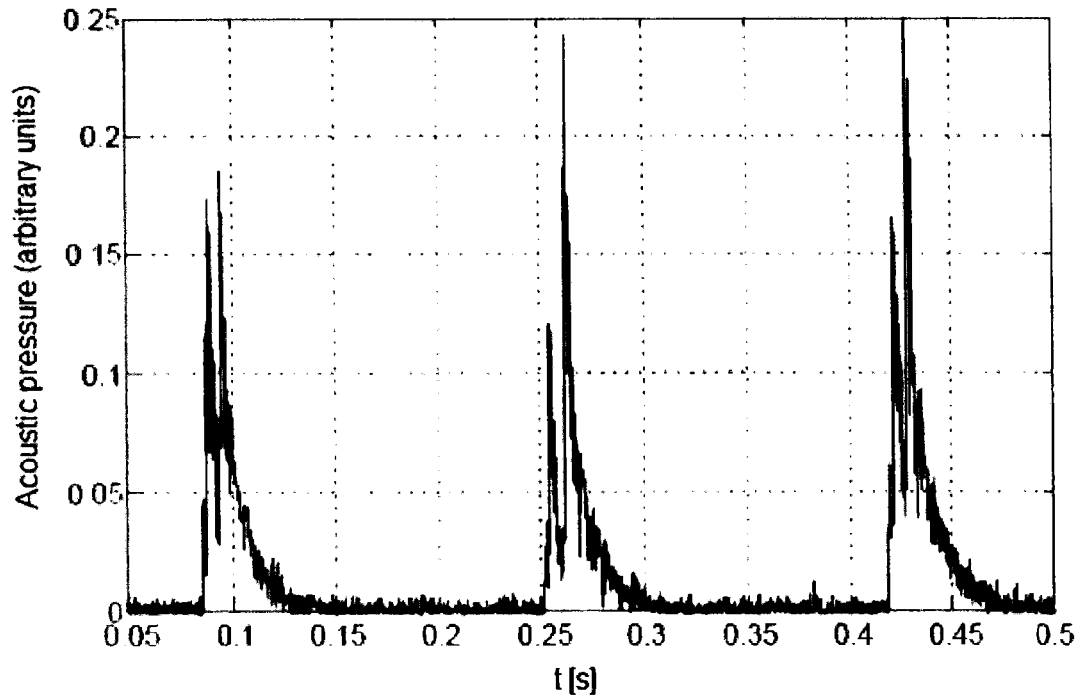

The passive indicator element mainly affects the signal frequency content, but has little effect on temporal shape. A comparison is shown in FIGS. 2a and 2b. The only difference is that in the presence of an indicator, the damping of the signal is slightly lower. The capacity to detect the escape wheel shocks is not, therefore, affected by the presence of the indicator, which ensures that the chronometry of the watch can be measured by using standard commercial devices.

Passive indicator element 2 may, for example, be a strip or blade, or a plate fixed to a part of regulating member 4 or of the transmission or maintenance member of the mechanical movement. The strip or blade may have a rectangular or oval cross-section. For example, strip 2 is fixed at one end thereof to the balance cock or bar 3, while the other end of the strip moves freely. The strip may be arranged above sprung balance 5 and parallel to the plane defined by the sprung balance wheel. Depending upon the space available, the strip may also be arranged in an orthogonal direction to the plane of the movement. The strip may be straight or configured to describe a portion of a circle, which may, for example, be centred on the axis of rotation 7 of sprung balance 5.

As this strip is fixed to the balance cock or bar, it does not affect the performance of the mechanical timepiece movement. The vibration of the strip is thus independent of the casing of the mechanical movement. The strip is specifically configured for each timepiece to be authenticated precisely by measuring the vibration frequencies of the strip.

Various methods may be envisaged for fixing the passive indicator element in the form of a strip or plate. As indicated above, the strip may be straight or bent with a simple or double embedment or an embedment-support to the balance cock or bar. In the case of a passive element in the form of a plate or wafer, the plate may be rectangular or almost rectangular with a simple or double or triple or complete embedment with the four sides fixed to the balance cock or bar.

Passive indicator element 2 may be made, for example, of a metallic material, such as steel. This passive indicator element, in the form of a strip, may be welded or soldered to a fixed support portion of the mechanical movement, for example to the sprung balance cock 3 or bar. The three dimensions of the element, such as the width, thickness and length, must in theory be comprised between 0.1 mm and 5 mm, or 10 mm. According to a preferred embodiment, its fundamental frequency must be comprised between 1 kHz and 4 kHz.

The passive indicator element may also be integral with cock 3 to form a single-piece part, and provide specific machining areas, for example, tips, hollow portions, micro-arms or other areas. The machined portions of the passive indicator element may be created before the watch is placed in its case to define the specific vibration frequency content which identifies the timepiece, in order to prevent any counterfeiting. The vibration frequencies of the strip specifically configured for the timepiece to be authenticated may be well known and defined with several significant figures, for example 4 or 5 figures.

Mainly, in cooperation with balance 5, regulating member 4, which includes the pallet lever and the wheel (not shown), generates vibrations during operation. These vibrations are transmitted across the plate and across the balance cock or bar 3 to make said passive indicator element vibrate. The acoustic noises, generated by the shocks between the balance and the pallet lever, and the pallet lever and the escape wheel, are the known tick-tock sounds of every mechanical watch movement. This passive indicator element 2 can advantageously vibrate within an audible frequency range between 100 Hz and 20 kHz. Further, in the configuration of passive element 2 shown in FIG. 1, tests have demonstrated that the shock resistance of this construction is guaranteed up to 5000 g.

It is to be noted that the passive element may also be a plate or any passive system able to vibrate, which is integrated inside a watch case. Preferably, this passive element is formed of a metal or an alloy of at least two metals or also of an amorphous metal or metallic glass. The vibrating passive metal element supplies an acoustic timepiece authentication or identification signature which can be picked up by a contact or aerial microphone of a measuring system. Each timepiece, particularly each mechanical timepiece movement, is uniquely identifiable by the different passive element configuration of each mechanical movement produced.

Other different types of material may be envisaged for making the passive element in the form, for example, of a strip. The materials used must have low temperature dependence and preferably be auto-compensated in temperature. The variation in Young's modulus and density must compensate for the geometric elongation-contraction, and also be resistant to natural oxidation. However, these criteria are not exclusive. A precious metal, ceramic, sapphire, quartz or silicon may be chosen as the material. Two materials may also be used to allow auto temperature compensation, particularly by using silicon with a layer of silicon oxide or two metals. The use of one or more magnetostrictive materials would have the additional advantage of permitting a simple magnetization diagnosis of a movement that is out of order. The passive element may also be made of one or more paramagnetic materials having magnetic permeability of less than 1.01.

By way of illustration, it is possible to observe the difference in acoustic noises generated by the mechanical movement for a standard escapement with no checking device in FIG. 2a and for an escapement provided with a checking device, such as a passive strip made to vibrate by the noise generated by the mechanical movement in FIG. 2b. The frequency content, i.e. one of the acoustic signature parameters, can be analysed by a measuring system with a contact or aerial microphone. As a result of the checking device of the present invention, it is possible to obtain behaviour which is independent of the conditions of measurement, with high emergence and a high signal to noise ratio, for movements of identical design. This was not the case of state-of-the-art mechanical movements.

Figure 3:
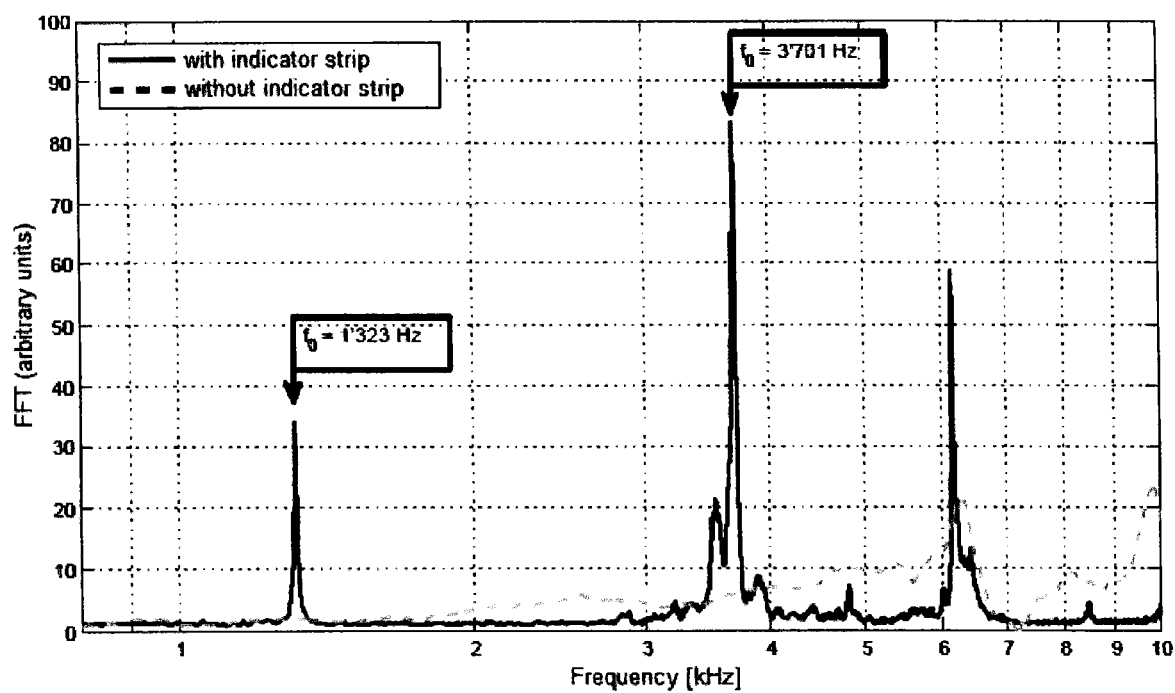
FIG. 3 shows a frequency graph showing the effect of the passive indicator element according to the invention on the acoustic signature of the timepiece in comparison to the noises generated by the mechanical movement.

By way of non-limiting example, with a specifically configured strip fixed to a fixed portion of the mechanical movement, FIG. 3 shows a frequency graph of the acoustic noises generated during the operation of the mechanical movement. It is possible to observe the effect of the checking device of the invention on the acoustic signature of the timepiece in comparison to the conventional noises generated by the mechanical movement. With a passive strip fixed to the fixed portion of the mechanical movement, a first vibrating mode of the strip can be observed, for example at 1323 Hz, the second vibrating mode at 3534 Hz, the third vibration mode at 3701 Hz and the fourth vibration mode at 6171 Hz. These acoustic noises mainly generated by the vibrating passive strip can be precisely measured by a measuring system for the precise authentication of the timepiece.

For the method, the checking of a unique code of acoustic identification of a timepiece can be performed via a mobile phone.

The method of allocating and checking said identification code of the timepiece can further include different steps before the operation of the mechanical movement and the vibration generation of the passive indicator element. First of all, the passive indicator element is fixed to a fixed support portion of the mechanical movement before closing a case of the timepiece, which includes said mechanical movement. Before delivery of the timepiece, an initial determination of the identification code of the timepiece is performed by an acoustic measurement of vibration frequencies of the passive indicator element. An allocation of identification code at a serial number of the mechanical movement is performed, and the identification code with the serial number are stored in a database and in a product certificate associated to the timepiece.

After delivery of the timepiece and after starting to operate the mechanical movement and the vibration generation of the passive indicator element, the identification code of the timepiece is checked. This checking consists in performing an acoustic measurement of vibration frequencies of the passive indicator element while comparing the determined identification code to the initially allocated code for the timepiece.

From the description that has just been given, several variants of the mechanical movement provided with the checking device for implementing the method for allocating and for checking a unique code of acoustic identification of a timepiece can be devised by those skilled in the art without departing from the scope of the invention defined by the claims. In the case of a timepiece with a double tourbillon, namely having two escapements, it is possible to fix to a fixed portion of each escapement a passive strip specifically configured for each escapement. This allows determining the identification code of the timepiece by an acoustic measurement of vibration frequencies of each passive indicator element. The natural vibration modes of each passive strip of the two tourbillons may be different to increase the precision of authentication of the timepiece. It would be possible to envisage the integration, in any mechanical or electronic apparatus, of this checking device, which is vibrated by components of the apparatus in order to authenticate the apparatus in which it is contained. The passive indicator element could vibrate outside the audible frequency ranges according to one or more vibration modes induced by the mechanical movement.

What is claimed is:
1. A method for allocating and for checking a unique code of acoustic identification of a timepiece, which includes a mechanical movement provided with at least one passive indicator element, which is configured to vibrate according to one or more clearly defined vibration frequency components following a vibration of the mechanical movement, wherein the method includes:
   starting to operate the mechanical movement to induce shocks in an escapement wheel sets, generating a vibration of the passive indicator element via the vibration of the mechanical movement to define an acoustic signature specific to the timepiece, and checking the code of the acoustic identification of the timepiece by an acoustic measurement of vibration frequencies of the passive indicator element, wherein the passive indicator element includes one end which is fixed to a fixed support portion of the mechanical movement such that the passive indicator element lowers a damping of a signal generated by the mechanical movement.

2. The method according to claim 1, wherein the checking of the identification code of the timepiece can be performed via a mobile phone.

3. The method according to claim 1, wherein the method includes:

fixing the passive indicator element to the fixed support portion of the mechanical movement before closing a case of the timepiece, which includes the mechanical movement, initially determining the identification code by an acoustic measurement of vibration frequencies of the passive indicator element, allocating the identification code at a serial number of the mechanical movement and storing the identification code with the serial number in a database and a product certificate associated to the timepiece, and after starting to operate the mechanical movement and the vibration generation of the passive indicator element, checking the identification code of the timepiece by an acoustic measurement of vibration frequencies of the passive indicator element and comparing said identification code with the code initially allocated to the timepiece.

4. A mechanical movement provided with a passive indicator element for implementing the method for allocating and for checking a unique code of acoustic identification of a timepiece according to claim 1.

5. The mechanical movement according to claim 4, wherein the passive indicator element is a strip or blade or a plate.

6. The mechanical movement according to claim 4, wherein the passive indicator element is a strip or blade having a rectangular cross-section.

7. The mechanical movement according to claim 4, wherein the passive indicator element is a strip or blade having an oval cross-section.

8. The mechanical movement according to claim 4, wherein the passive indicator element is a straight strip or blade, the other end of which moves freely.

9. The mechanical movement according to claim 4, wherein the passive indicator element is a straight strip or blade, both ends of which are fixed to the fixed support portion of the mechanical movement.

10. The mechanical movement according to claim 4, wherein the passive indicator element is a curved strip or blade, one end of which is fixed to the fixed support portion of the mechanical movement and the other end of which moves freely.

11. The mechanical movement according to claim 4, wherein the passive indicator element is a curved strip or blade, both ends of which are fixed to the fixed support portion of the mechanical movement.

12. The mechanical movement according to claim 4, wherein the passive indicator element is fixed to the fixed support portion of a regulating member of the mechanical movement.

13. The mechanical movement according to claim 12, wherein the passive indicator element is fixed to a balance cock or bar which forms the fixed support portion of the mechanical movement.

14. The mechanical movement according to claim 13, wherein the passive indicator element is made of a metallic material and is welded or soldered to the balance cock or bar.

15. The mechanical movement according to claim 13, wherein the passive indicator element is made of a metallic material, and in that the passive indicator element is integral with the balance cock or bar and is machined to define one or more clearly defined vibration frequencies.

16. The mechanical movement according to claim 12, wherein the passive indicator element is a strip or blade arranged parallel to a plane defined by a wheel of a sprung balance of the regulating member.

17. The mechanical movement according to claim 16, wherein the strip or blade defines a portion of a circle centred with respect to an axis of rotation of the sprung balance.

18. The mechanical movement according to claim 4, wherein the passive indicator element is formed of a metal or of an alloy of at least two metals or of an amorphous metal or metallic glass.

19. The mechanical movement according to claim 18, wherein the passive indicator element is made of steel.

20. The mechanical movement according to claim 18, wherein the passive indicator element is made of precious metal.

21. The mechanical movement according to claim 4, wherein the movement includes two passive indicator elements, a first passive indicator element being fixed to a fixed support portion of a first regulating member of the mechanical movement, and a second passive indicator element being fixed to a fixed support portion of a second regulating member of the mechanical movement.

22. The mechanical movement according to claim 21, wherein the first and second passive indicator elements are configured differently from each other with different vibration frequency components to define a specific acoustic signature of the timepiece.

23. The mechanical movement according to claim 4, wherein the passive indicator element is made of ceramic.

24. The mechanical movement according to claim 4, wherein the passive indicator element is made of one or more paramagnetic materials with magnetic permeability of less than 1.01.

25. The mechanical movement according to claim 4, wherein the passive indicator element is made of one or more magnetostrictive materials.

26. The mechanical movement according to claim 4, wherein the passive indicator element is made of silicon.

27. The mechanical movement according to claim 4, wherein the passive indicator element is made of an auto-compensated temperature material.

* * * * *